Jan. 14, 1969  E. M. TUCKER  3,422,390
COUPLING DEVICE

Filed Dec. 28, 1967  Sheet 1 of 2

Elton M. Tucker
INVENTOR.

BY
ATTORNEYS

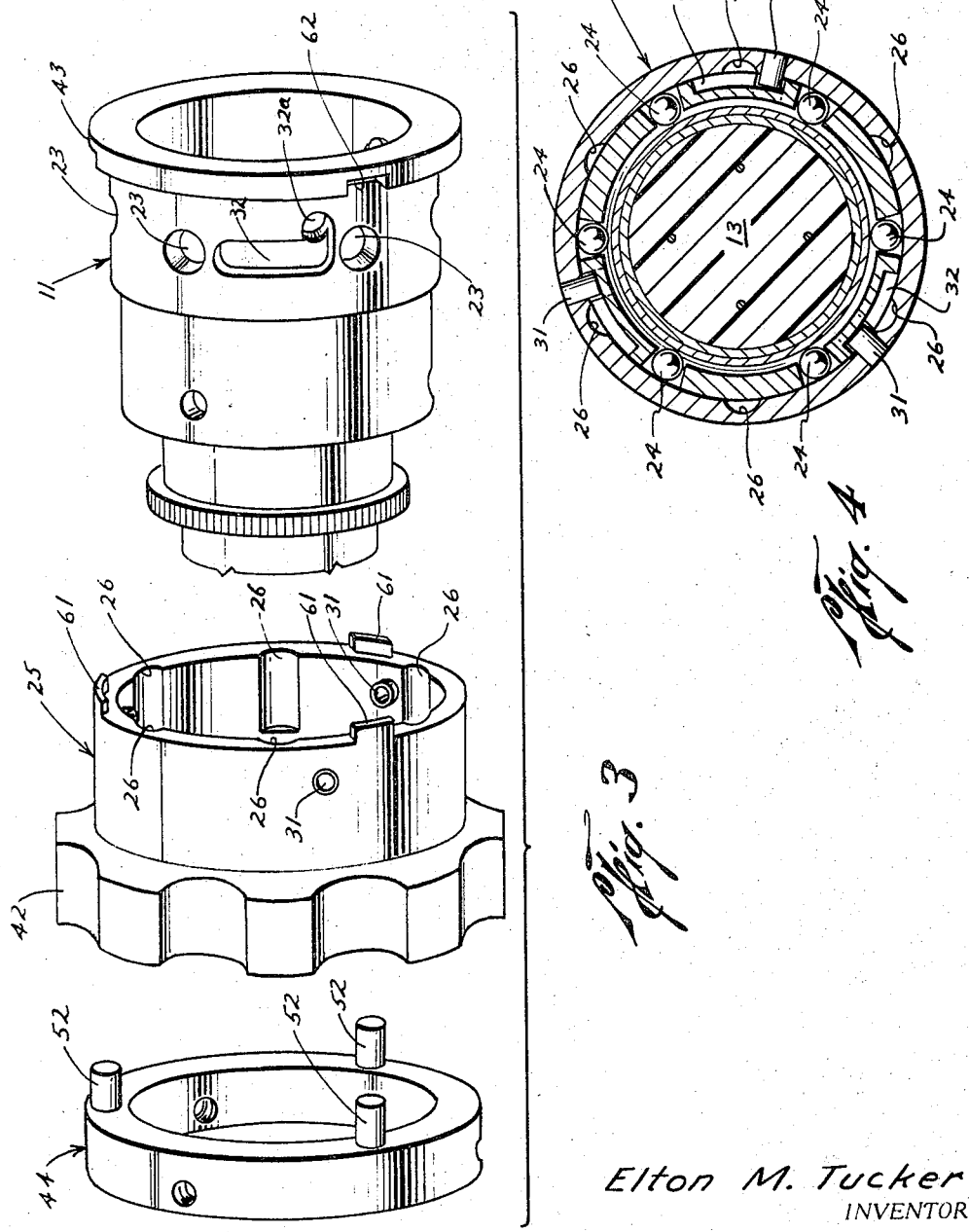

United States Patent Office 3,422,390
Patented Jan. 14, 1969

3,422,390
COUPLING DEVICE
Elton M. Tucker, La Porte, Tex., assignor to the United States of America as represented by the Administrator of the National Aeronautics and Space Administration
Filed Dec. 28, 1967, Ser. No. 694,247
U.S. Cl. 339—91                                7 Claims
Int. Cl. H01r 13/54

ABSTRACT OF THE DISCLOSURE

A releasable coupling comprising a pair of telescopically engageable tubular shell members which are designed to receive and retain the mating ends of an electrical connector or other objects to be coupled. A plurality of locking balls are floatingly mounted in the wall of the outer shell member and are held captive by a locking sleeve assembled over the outer shell member. The sleeve is journalled for low-torque rotation on the outer shell and limited in rotary movement by mechanical stop means on the locking sleeve and outer shell member between a first unlock position wherein the balls are in registry with unlocking relief grooves in the inner wall of the locking sleeve and a second position wherein the balls are cammed radially inward by the locking sleeve. The locking balls in the locked position protrude into a locking groove in the external surface of the inner shell member when the shells are telescoped together, thereby preventing axial separation of the two shell members. The outer shell and the locking sleeve which is spring-biased against a radial end flange of the outer shell are provided with cooperable latching means when the sleeve is rotated to its locked position, thereby precluding accidental rotation of the locking sleeve to the unlocked position. Release is effected by longitudinal movement of the locking sleeve against the spring bias to release the cooperable latching means and then rotating to its unlocked position. A hermetic seal is provided between the shell members when they are in a coupled relationship.

The invention described herein was made by an employee of the United States Government and may be manufactured and used by or for the Government for governmental purposes without the payment of any royalties thereon or therefor.

This invention relates to a coupling device which is particularly adapted for use with an electrical connector of the type wherein a plurality of contacts at the pin end of an electrical connector are receivable in a plurality of receiving sockets in the receptable end of the connector. Most coupling devices for electrical connectors which have heretofore been designed are generally unsuited for use by personnel in pressurized space suits, and particularly when in a zero gravity space environment. Under such conditions the operations of coupling and uncoupling these devices require the expenditure of considerable effort. In addition, they are extremely difficult to actuate because of the high torque characteristics of the devices, the small size of their manipulative parts, and the number of required operational steps.

The coupling device of this invention which has been devised to overcome the attendant disadvantages of the prior art devices comprises a pair of telescopically engageable tubular shell members, each of which is designed to receive and retain an electrical core which may be one of many different configurations and sizes. A plurality of locking balls are floatingly mounted in the wall of the outer shell member and are of a diameter greater than the thickness of the wall in which they are mounted. A locking sleeve having a large radial flange of sufficient diameter to be easily grasped by the gloved hand is sleeved over the outer shell and holds the ball detents captive in the wall of the outer shell member. The locking sleeve is also journalled for rotation on the outer shell, but is limited in its travel by stop pins which protrude from the inner wall of the locking sleeve into corresponding arcuate grooves formed in the external surface of the outer shell. By their arcuate extent the arcuate grooves limit rotation of the locking sleeve between a first "unlock" position wherein the ball detents are in registry with unlocking relief grooves in the inner wall of the locking sleeve and are thereby permitted limited radial movement outwardly free of the internal bore of the outer shell member, and a second position wherein the balls are cammed radially inward to protrude into a circumferential locking groove in the external surface of the inner shell member when the shells are telescoped together, thereby preventing axial separation of the shell members. The locking sleeve is spring-biased against a radial end flange of the outer shell and is provided with latching prongs which mesh with latching slots in the end flange of the outer shell when the sleeve is rotated to its lock position, thereby precluding accidental rotary movement of the locking sleeve to the unlock position and providing a redundant locking feature. Release of the coupling is effected by longitudinal retraction of the locking sleeve from the end flange of the outer shell to effect separation of the latching prongs and slots followed by rotation of the locking sleeve to its unlock position. Axial separation of the coupling shell members is then possible. An hermetic seal for the coupling is provided by an O-ring mounted in the inner wall of the outer shell which seals against the external surface of the inner shell member when the two are in coupled relationship.

Other objects and many of the attendant advantages of this invention will be readily appreciated by reference to the following detailed description when considered with the accompanying drawings in which like reference numerals designate like parts throughout the figures thereof and wherein:

FIG. 3 is an exploded view in perspective, showing external features of the outer shell member of the coupling of this invention, and details of the locking sleeve and retaining ring which are mounted thereon; and FIG. 4 is a cross-sectional transverse view of the coupling assembly of this invention as taken along the line 4—4 in FIG. 1 and looking in the direction of the arrows.

Figure 1:
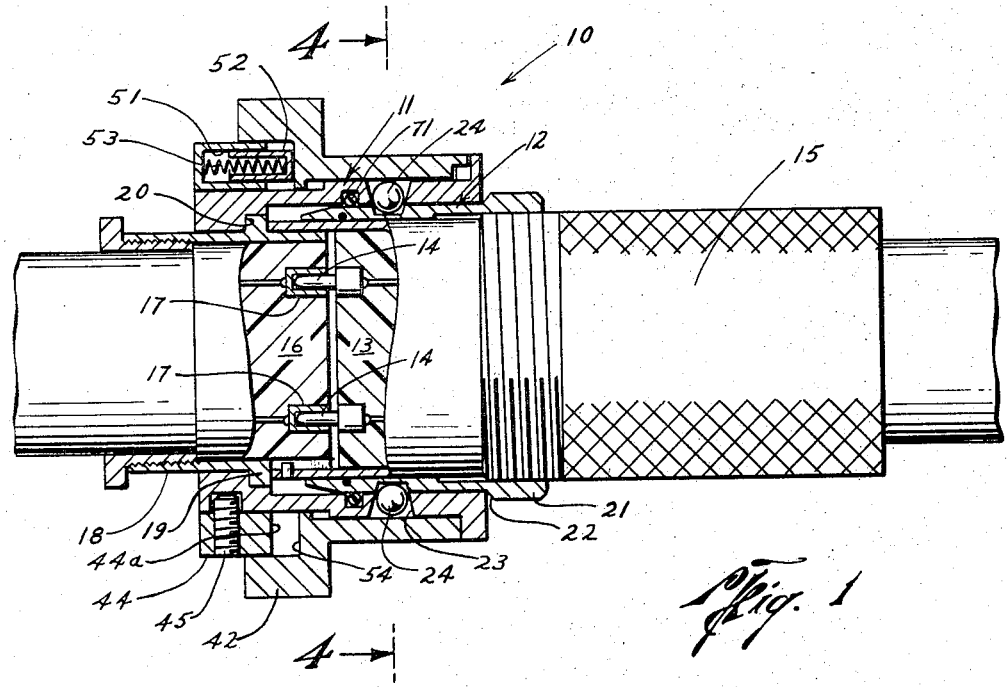
FIG. 1 is a longitudinal sectional view of the coupling device of this invention showing the assembly in its coupled locked condition.
Figure 2:
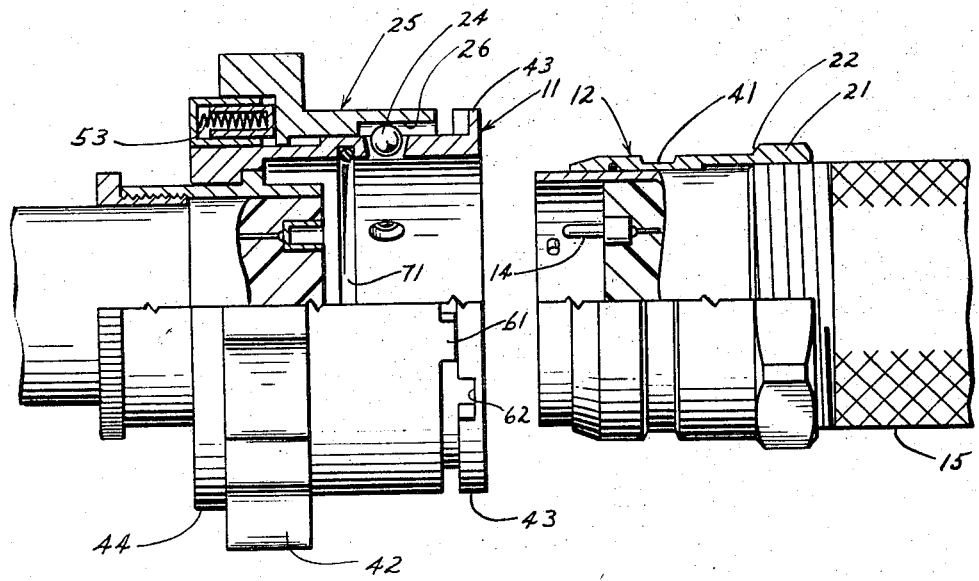
FIG. 2 is a view partly in longitudinal section showing the coupling members of the coupling of this invention in unlocked, disengaged condition.

Referring more particularly to the drawings, there is shown in FIGS. 1 and 2 the coupling 10 which represents a preferred embodiment of this invention. The coupling 10 comprises a pair of telescopically engageable tubular shell members 11, 12. The outer shell 11 is provided with an axial bore having an internal diameter slightly larger than the external diameter of the inner shell member 12 which is adapted to telescope snugly therein. Securely mounted within the inner shell 12 is the pin end of an electrical connector of the multi-contact type which comprises a core piece 13 of rubber, or the like, in which are molded a plurality of contact pins 14 having connection with conductors in the cable 15. The cable is provided with external threads which engage with internal threads provided in the internal wall of the inner shell 12 at one end thereof. Similarly, the receptacle end of the electrical connector is mounted within the bore of the outer shell 11 and includes a rubber core piece 16 having a plurality of contact receptacles 17 supported therein which are adapted to receive the contact pins therein upon longitudinal movement of the cable ends in their axial direction towards one another. For securing the receptacle end of the multicontact connector in the coupling shell member 11, a sleeve member 18 affixed to the core piece 16 is provided with a radial flange 19 which sets against a shoulder 20 provided by a reduced diameter section of the axial bore through the shell 11.

The inner shell 12 is also provided at one end with a portion 21 of enlarged outer diameter which provides a generally radial external shoulder 22 which limits the extent to which the inner shell 12 is receivable in the outer shell 11. In the innermost telescoped position of the shell 12 within the shell 11, the contact pins of the pin end of the electrical connector are received in the receptacle end of the connector and firm electrical connection is made.

It is to be understood, of course, that while the shell members 11 and 12 are shown carrying the respective connectable ends of a typical electrical connector, other objects to be coupled, such as conduits or the like, could be mounted in the respective shell members.

The outer shell 11 is provided with a plurality of openings 23 through the wall thereof which are equidistant from a given end of the shell 11, and are circumferentially spaced in uniform manner. The openings 23 are shaped to provide frustoconical seating surfaces having their narrowest diameter at the opening in the inner wall of the shell 11. Seated within the openings 23 and floatingly mounted therein, are a plurality of locking balls 24 of slightly larger diameter than the diameter of the opening 23 at the inner wall of the shell 11.

The balls are retained in the openings 23 by a locking sleeve 25 which is sleeved over the outer shell 11 and is journalled for a limited degree of rotation thereon. As best shown in FIG. 3, the inner wall of the locking sleeve is provided with a number of elongate "unlocking" relief grooves 26 which extend in the longitudinal direction from one end of the sleeve. The relief grooves 26 are equal in number to the ball detents and are correspondingly spaced, whereby the locking sleeve is adapted to be rotary positioned on the outer shell 11 with the grooves 26 in registry with the locking balls, as appears in FIG. 2. The locking balls are thus accorded a limited radial movement outwardly of the ball-seat openings 21.

The locking sleeve 25 is permitted only a limited degree of rotary movement on the outer shell by means of stop pins 31 which protrude through the inner wall of the locking sleeve and project into arcuate grooves 32 formed in the external surface of the outer shell 11. As best shown in FIG. 4, three such stop pins are provided and these are equally spaced circumferentially about the shell. Each arcuate groove 32 extends in a radial plane relative to the outer shell 11 and at one end includes a perpendicularly extending groove portion 32a for a purpose to be hereinafter described. The length of the arcuate groove in the radial plane is less than the spacing between the ball detent openings, and it is thus apparent that the locking sleeve is permitted a degree of angular movement which is less than the angular spacing between the ball detent openings.

When the locking sleeve is positioned whereby each pin is at the extremity of the arcuate groove remote from its perpendicular extension 32a, the "unlocking" relief grooves 26 in the inner wall of the locking sleeve are in registry with the locking balls, and each ball is thereby permitted some limited radial movement in its associated ball-seat opening 23. However, upon rotation of the locking sleeve whereby the stop pins are directed towards the other extremity of the arcuate grooves, as shown in FIG. 4, each locking ball is cammed radially inward by the inner wall of the locking sleeve into a circumferential "locking" groove 41 provided in the external wall of the inner shell 12 which thereby prevents any endwise axial movement of the two shells.

To facilitate grasping of the locking sleeve whereby it may be easily rotated on the shell 11, it is provided with a large radial flange 42 formed with large scalloped indentations in its peripheral surface. It is also retained on the shell 11 by an external annular flange 43 which is provided at one end of the shell 11 and a retaining ring 44 which is fastened on the other end of the shell 11 by set screw means 45.

The locking sleeve 25 is spring-biased into engagement with the flange 43 of the shell 11. As shown in FIGS. 1 and 3, the end wall 44a of the retaining ring which faces the locking sleeve is provided with a plurality of axially extending elongated spring-receiving chambers 51 which are circumferentially spaced about the retaining ring. Slidably mounted in each of the chambers is a cylindrical spring housing 52 which is open at one end and receives a spiral spring 53 therein. One end of the spring presses against the end of the chamber 51 in the retaining ring, and the other end of the spring urges the spring housing 52 outwardly of the chamber 51 and against an annular radial shoulder 54 of the locking sleeve. The shoulder 54 is formed by an enlargement of the axial bore through the locking sleeve. It is thus readily seen that the locking sleeve 25 is spring-loaded against the end flange 43 at the right end of the shell 11 as shown in FIGS. 1 and 2, and is permitted a limited amount of longitudinal movement as represented by the spacing between the retaining ring 44 and the radial shoulder 54 when the locking sleeve is engaged against the end flange 43 of the shell 11.

As best seen in FIGS. 2 and 3, the locking sleeve is provided with latching prongs 61 which extend from the end of the locking sleeve in the axial direction thereof. These prongs engage the radial end flange 43 of the shell 11. A redundant locking capability is achieved by the spring loading of the locking sleeve which, when the locking sleeve is rotary positioned whereby the stop pins 31 are at the extremities of the arcuate grooves 32 corresponding to the groove extensions 32a, urges the latching prongs 61 into corresponding latching slots 62 which are provided in the end flange 43 of the shell 11. The stop pins also move into the groove extensions 32a. The locking sleeve is thus prevented from any unintentional rotation relative to the shell 11 that would permit unintentional disengagement of the coupling.

It should be readily apparent, therefore, that to unlock the coupling 10 it is necessary to retract the locking sleeve against the biasing action of the springs 53 and thereby withdraw the latching prongs 61 from the latching slots 62. The locking sleeve is then freed for rotary movement to the unlock position at which the relief grooves 26 in the inner wall of the locking sleeve are placed in registry with the locking ball detents and thus allow for their retraction from the circumferential locking groove 41 in the inner shell 12. It will therefore be seen that an endwise pull which tends to separate the electrical connector and the coupling shells 11 and 12 causes the side wall of the locking groove 41 to cam the balls radially outward where they no longer interfere or lock with the shell 12. Separation of the coupling 10 to the condition shown in FIG. 2 is thereby easily effected with simple, low force motions.

It will therefore be seen that the coupling of this invention requires a very low-torque for its operation to either lock or unlock the coupling. This feature is especially advantageous to personnel in pressurized space suits who, particularly when in a zero gravity environment, are thus enabled to easily actuate the coupling with a minimum of exertion and with minimum complication. The coupling structure also provides for hermetic sealing by the installation of an O-ring 71 in an annular groove formed in the inner wall of the shell 11 in a location where the O-ring seals against the external wall of the shell 12 when the coupling is in its coupled condition.

To prevent corrosion of the coupling, the springs 53 and the ball detents 22 are preferably formed of stainless steel, or the like. Like materials such as protective aluminum should also be used for the other hard components of the coupling device 10.

It should also be understood that the foregoing disclosure relates only to a preferred embodiment of the invention, and that it is intended to cover all changes and modifications of the example of the invention herein chosen for the purposes of the disclosure and which do not constitute departure from the spirit and scope of the invention.

What is claimed and desired to be secured by Letters Patent is:

1. A releasable coupling device comprising an outer tubular shell member and an inner tubular shell member which is telescopically receivable therein;
   a plurality of ball detent means mounted in the wall of said outer shell member for limited radial movement relative to said outer shell member, the diameter of each said ball detent being greater than the wall thickness of said outer shell member, said inner shell member having a locking groove in the external surface thereof;
   an external locking sleeve member disposed in sleeved relationship to said outer shell member to thereby maintain said ball detents captive in said wall, said locking sleeve being mounted for limited rotation on said outer shell member independent of axial movement, and provided with a plurality of longitudinally extending unlocking relief grooves in the inner wall thereof which correspond in number and spacing to said ball detents, said sleeve being rotatable between a first rotary position wherein said ball detents are in registry with said relief grooves to thereby be movable outwardly of said outer shell member to where they do not protrude into the bore of said outer shell member;
   a second rotary position wherein the ball detents are cammed radially inward by the inner wall of said locking sleeve to protrude into the bore of said outer shell member whereby they are disposed in interfering engagement with said locking groove of said inner shell member when said inner shell member is telescopically engaged with said outer shell member thereby preventing separation of said shell members;
   stop pin means cooperatively engageable with groove means in the external surface of said outer shell member for limiting the rotation of said locking sleeve between said first and second rotary positions, said groove means being formed to permit limited longitudinal movement of said locking sleeve relative to said outer shell when in said second rotary position;
   cooperable latching means on said locking sleeve and said outer shell member which are engageable when said locking sleeve is in said second rotary position; and spring means between said locking sleeve and said outer shell member to automatically move said latching means into engagement when in the second rotary position thereby guarding against accidental rotation of the locking sleeve on said outer shell member.

2. A releasable coupling device as described in claim 1 further including external shoulder means on said inner shell member for limiting the extent to which said inner shell member is insertable into said outer shell member, and for readily positioning said inner shell member at a location relative to said outer shell member wherein said locking balls are in registry with the locking groove in the external wall of said outer shell member and adapted to be locked therein upon rotation of said locking sleeve to second rotary position.

3. A releasable coupling device of the character described in claim 1 further including hermetic sealing means carried by one of said shell members for effecting a hermetic seal between the telescoped shell members when they are in telescoped coupled relationship.

4. The releasable coupling device specified in claim 1 wherein the groove means on said outer shell is L shaped with the vertical leg of the L extending circumferentially and the lateral portion of the L extending longitudinally.

5. The releasable coupling device specified in claim 1 wherein the cooperable latching means is formed by providing the locking sleeve with a plurality of circumferentially spaced latching prongs which extend axially from the end thereof and the outer shell has a radial end flange having a plurality of circumferentially spaced mating latching slots, said prongs and slots being moved into engagement by said spring means when in the second rotary position thereby preventing rotation until there is axial movement releasing the cooperable latching means.

6. The releasable coupling device specified in claim 1 including the outer and inner tubular members are provided with electrical cores having a plurality of conductors which are in mating engagement when the outer and inner tubular members are telescoped together.

7. The releasable coupling device specified in claim 1 including the locking sleeve member having an enlarged radially extending flange to facilitate rotation of the locking sleeve member relative to the outer shell.

References Cited
UNITED STATES PATENTS

| | | | |
|---|---|---|---|
| 1,371,882 | 3/1921 | Ferguson et al. | 285—277 |
| 2,006,833 | 7/1935 | Jensen | 285—96 |
| 2,081,571 | 5/1937 | Baade | 285—168 |
| 2,470,256 | 5/1949 | McIlroy | 285—168 |
| 2,892,991 | 6/1959 | Beebee et al. | 339—91 |
| 3,191,972 | 6/1965 | Collar | 285—93 |
| 3,351,886 | 11/1967 | Zimmerman | 339—90 |

MARVIN A. CHAMPION, *Primary Examiner.*

JOSEPH H. McGLYNN, *Assistant Examiner.*

U.S. Cl. X.R.

285—85, 277